Feb. 4, 1969
D. J. SEAMAN
3,426,146
GRADE AND ALIGNMENT APPARATUS UTILIZING
CLOSED CIRCUIT TELEVISION
Filed Oct. 22, 1965
Sheet 1 of 2
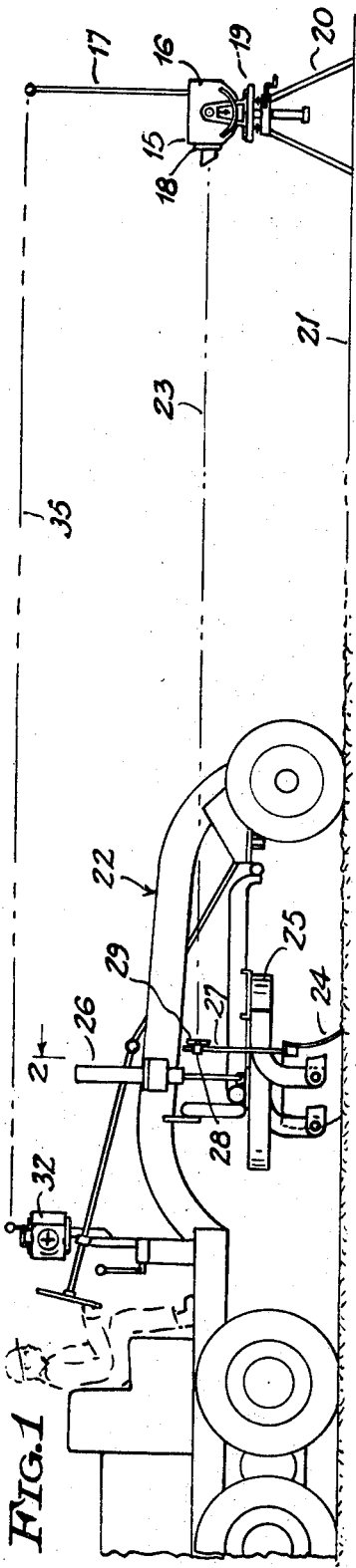
INVENTOR
DONALD J. SEAMAN
BY Christopher L. Ward
ATTORNEY

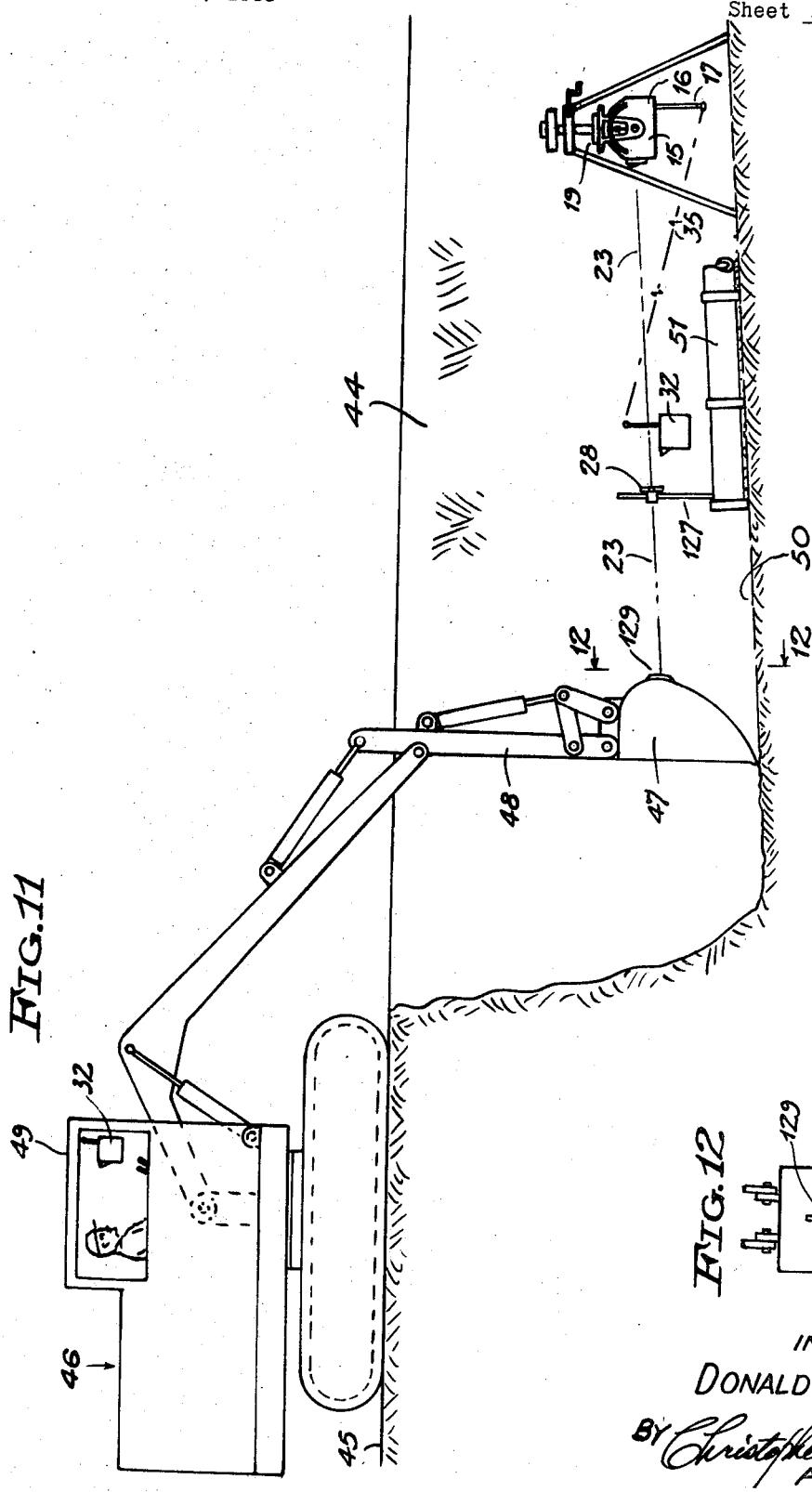

3,426,146
GRADE AND ALIGNMENT APPARATUS UTILIZING CLOSED CIRCUIT TELEVISION

Donald J. Seaman, Glendale, Wis., assignor to Seaman Nuclear Corporation, Milwaukee, Wis., a corporation of Wisconsin
Filed Oct. 22, 1965, Ser. No. 500,733
U.S. Cl. 178—6.8
Int. Cl. H04n 5/84
6 Claims

ABSTRACT OF THE DISCLOSURE

A construction machine including a blade member or the like, means for displacing said blade member vertically and laterally, a target member carried by the blade member, a television camera mounted in a fixed position displaced from the construction machine and being constructed and arranged to be mounted at a preselected height and angular position to establish a predetermined line of sight. A transmitter is associated with the camera and a receiver is mounted on the construction machine and located to be observed by the operator, wherein the target member may be disposed in the camera's field of view and the blade member displaced vertically and laterally in accordance with the line of sight established by the camera.

---

This invention relates to grade and alignment apparatus, as for use in earth-working, road-making and pipe-laying operations.

It has heretofore been proposed to provide grade and alignment apparatus in which a line of sight is produced by projecting a beam of light or other radiant energy and disposing a stationary or moving target in the beam, so as to establish one or more reference points.

An object of the invention is to provide an improved and simplified grade and alignment apparatus in which a line of sight is produced by television camera to form an image of a target disposed in the line of sight, and in which the target image is transmitted to a receiver or monitor to indicate alignment and to aid in various construction operations.

In one form of apparatus embodying the invention the target is carried on a road-building machine, such as a motor grader, bulldozer, or paver, and the viewing monitor is carried on the machine to guide the operator in adjusting the machine to a desired operating condition. In another form of apparatus the target is applied to paving forms to aid in erecting and adjusting the forms. In still another form of apparatus, the target is placed in a sewer pipe-line trench to aid accurate laying of pipe to a predetermined selected grade. In a further form of apparatus, the target is carried on an excavating element, such as the bucket of a back-hoe, to aid the operator of the machine in digging a pipe-line trench to a desired depth and slope.

The invention further consists in the several features hereinafter described and claimed.

In the accompanying drawings, illustrating certain embodiments of the invention, FIG. 1 is a diagrammatic lateral elevational view showing grade and alignment apparatus of the invention arranged for facilitating guidance of a target-carrying motor grader in a leveling operation FIG. 2 is a transverse sectional elevational view of the target-carrying grader taken generally on the line 2—2 of FIG. 1;

FIG. 3 is a front elevational view of a portable television receiver or monitor with an indicia-bearing screen for displaying the image of the target, the target image being shown in centered relation on the screen;

FIG. 4 is a view similar to FIG. 3, showing a target image displayed on the screen in offset relation, indicating that correction is required in the grader course and blade adjustment;

FIG. 5 is a fragmentary front elevational view of the rod-carried target;

FIG. 6 is a transverse sectional elevation of the rod-carrying target;

FIG. 7 is a front elevational view of a modified form of target;

FIG. 8 is a diagrammatic lateral elevational view showing grade alignment apparatus of the invention arranged for facilitating adjustment of a target-carrying paving machine;

FIG. 9 is a transverse sectional elevation of a roadway form assembly with a target-carrying rod applied thereto and associated with a television receiver or monitor;

FIG. 10 is a diagrammatic lateral elevational view showing the target-carrying form assembly and a cooperating television camera;

FIG. 11 is a lateral elevational view, partly in section, showing grade alignment apparatus of the invention applied to a sewer pipe-line trench and associated excavator for guidance in the trenching and pipe-laying operations, and FIG. 12 is a rear view of a target-carrying excavating bucket of the excavator.

Referring to the embodiment of the invention shown in FIGS. 1 to 6, 15 designates a television camera and 16 an associated television transmitter with an antenna 17, the camera being preferably provided with a zoom-type lens 18. The combined camera and transmitter unit is mounted on a transit or theodolite structure 19 of conventional type per se provided with a supporting tripod 20 adapted to be rested on a ground surface 21. In some instances, the television transmitter may be a separate unit. In the present instance, the ground surface 21 is irregular and is adapted to be leveled by a blade-carrying road-working vehicle 22 to form a roadway which may be either horizontal, as shown, or sloping. By way of example, the road-working vehicle is here shown to be a motor grader. However, the vehicle may also be in the form of a bulldozer. If desired, the completed roadway may be crowned. The transit structure is adjusted to train the optical axis of the camera along a desired orientation or line of sight 23 extending lengthwise of the roadway area.

The grader 22 is of a conventional power-driven type and is provided with the usual cutting blade 24 adjustable about a vertical axis on a turntable 25 and capable of being raised, lowered and tilted by a suitable operating mechanism including hydraulic cylinders 26. In accordance with the present invention the blade had rigidly secured thereto a pair of selectively usable upstanding target poles or rods 27, one being shown at each end thereof, each rod carrying a vertically adjustable target member 28 including a cross-shaped target element 29 adapted to intersect the extended optical axis or line of sight of the camera when the blade is at the desired cutting elevation, so as to form an image of the target element in the camera. In some instances, the target element is luminescent to emit visible or infra-red light, and is here shown to be equipped with a lamp 30 supplied with current from a battery 31, FIG. 6. The grader also carries a portable television receiver or monitor 32 in convenient view of the operator. The receiver includes a viewing screen 33 provided with a fiducial marking 34 such as perpendicular calibrated cross lines. The receiver or monitor is suitably coupled to the television transmitter as by a radio channel or link 35, so as to form a visual image 36 of the target on the viewing screen when the target is in the field of view of the camera. When the target lies in the line of sight of the camera the target image will be centered on the screen, as seen in FIG. 4. Lateral deviation of the target with respect to the line of sight will cause the target image to deviate correspondingly. The screen is also angularly adjustable about the viewing center or axis to cooperate with a calibrated angular scale 37 extending on each side of horizontal and is suitably retained in adjusted position. This arrangement will facilitate grading of laterally extending slopes.

In use, the television camera 15 is adjusted to place its optical axis at the desired orientation. The grader 22 is placed by the operator in a position remote from and facing the camera, and the cutting blade 24 is raised or lowered to center the image of the selected target on the viewing screen of the monitor 32. The machine is then propelled toward the camera, the operator adjusting the course of the machine and the elevation of the cutting blade so as to maintain the targe image centered on the monitor screen. Similar adjustments are made during the travel of the grader away from the camera. In this case the target members are reversed on the rods, or double-faced target members may be used.

In the form of target apparatus shown in FIG. 7 the target member 28' is of diamond shape and centrally carries thereon a cross-shaped target element 29' of contrasting visibility. As in the device of FIG. 6, the cross-shaped target element 29' may be illuminated with visible or infra-red light.

In the form of the invention shown in FIG. 8, the road machine is in the form of a paving machine 22' and the vertically-adjustable screen or strike-off 24' thereof has mounted thereon one or more selectively usable target rods or poles 27 each carrying a target member 28 with a cross-shaped target element 29. As in FIG. 1, a line of sight is established by the television camera unit 15, 16 and a television receiver or monitor 32 with a viewing screen is carried by the machine in convenient position to the machine operator to display the target image which is viewed by the operator to guide him in controlling the machine, and particularly in adjusting the elevation of the screed to finish the paved surface 21'.

The apparatus of the invention is also applicable to a paving machine of the slip-form type in which the machine is provided with the projectable paving forms.

In FIGS. 9 and 10 the grade alignment apparatus of the invention is shown to be used for setting conventional paving forms 38, one being shown. The form is of the usual angle shape with a vertical flange 39 and a top flange 40 which latter is perforated at intervals to receive supporting stakes 41, one being shown. A vertical target rod 27' is provided with a shoulder 42 to rest on the top flange of the form, and the lower portion of the rod is temporarily held against the vertical flange 39 of the form. The upper portion of the rod carries a cross-shaped target member 28 which is disposed in the field of view of the grade-aligning television camera unit 15, 16. A portable television receiver or monitor 32 is rested on the ground near the form in view of the workman. When the paving form is in its proper position, the target image will be centered on the monitor screen. The form is retained in adjusted position by the usual wedging or blocking elements 43.

In FIGS. 11 and 12 the invention is shown to be used as guiding and aligning means for trenching and pipe-laying operations. A trench 44 is dug from ground level 45 as by means of a suitable excavator 46, here shown to be of a conventional back-hoe of the hydraulic type having an excavating bucket 47 mounted on a dipper stick 48 forming part of an actuating linkage controlled by an operator in the excavator cab 49. The bottom 50 of the trench is cut to a predetermined selected grade to receive a sloping sewer pipe-line 51. The television camera and transmitter unit 15, 16, hereinbefore described, is mounted in the trench, and is preferably disposed in inverted relation on the transit structure 19 to provide a low position. The inclined line of sight 23 of the camera is directed medially along the trench above the bottom of the trench at a predetermined orientation or azimuth. The back-hoe bucket 47 is here shown to carry on its back surface a cross-shaped target element 129 lying in the vertical medial plane of the bucket and at an elevated region thereof to minimize abrasion. A television receiver or monitor 32 is mounted in the excavator cab in convenient view of the operator, and is coupled to the television transmitter by a radio link.

In the trench-forming operation of the back-hoe, when the target image is centered on the viewing screen of the monitor, the back-hoe bucket 47 will be at the proper digging depth.

In the present instance, the inclined line of sight 23 of the television camera lies above the course of the pipe-line 51 and in the vertical plane thereof. In laying the pipe-line, a grade pole or rod 127 is rested in vertical position on the first pipe section and carries a target member 28 which is disposed in the field of view of the camera. A portable television receiver or monitor 32 is placed nearby to be viewed by the pipe-setter and is coupled to the television transmitter, as by a radio link 35. The pipe section is adjusted in position to center the target image on the monitor screen, the grade pole 127 being shifted along the pipe section to check the desired grade and orientation. Succeeding pipe sections are laid in a similar manner. The camera line of sight is here shown to extend above the pipe-line, but it may also be disposed within the pipe-line, as in the case of large-diameter pipe.

In some instances, the television transmitter may be coupled to the receivers or monitors by a wire link instead of a radio link.

In some types of equipment, the positions of the camera and target may be transposed. For example, both the camera and the monitor may be carried on a vehicle and the target may be stationary.

What is claimed is:

1. A construction machine including an operative element for performing a predetermined operative function, means for displacing said element vertically and laterally to effect modification in alignment, target means carried by said element, television camera means disposed in spaced relation from said machine and arranged to be mounted at a preselected height and angular position to establish a predetermined line of sight, transmitter means coupled to said camera, a television receiver mounted on said construction machine and having an image displaying screen located to be observed by the operator of said machine, wherein said target means may be disposed in the field of view of the camera and said element may be operated and displaced vertically and laterally in accordance with said line of sight to place said target in a predetermined position within the screen to indicate the desired predetermined position of said element.

2. The combination set forth in claim 1 wherein said camera is carried on a tripod and includes means for adjusting the angle of deflection and inclination.

3. The combination set forth in claim 2 wherein the target and television viewing screen each have cruciform indicating portions for determining deviations of said target from said line of sight.

4. The combination set forth in claim 3, and including means for adjusting one of said cruciform indicating portions through preselected angles.

5. The combination set forth in claim 4 wherein said operative element is an earth-cutting blade.

6. The combination set forth in claim 4 wherein said operative element is a screed of a paving machine.

References Cited

UNITED STATES PATENTS

| | | | |
|---|---|---|---|
| 2,359,032 | 9/1944 | Gott | 178—6 |
| 2,916,836 | 12/1959 | Stewart | 88—14 |
| 3,000,121 | 9/1961 | Martin | 88—14 |
| 3,071,049 | 1/1963 | Pizzarotti | 88—14 |
| 3,101,175 | 8/1963 | Brown | 178—6 |
| 3,242,340 | 3/1966 | Layne | 88—14 |

ROBERT L. GRIFFIN, *Primary Examiner.*

J. A. ORSINO, Jr., *Assistant Examiner.*

U.S. Cl. X.R.

88—14